3,461,147
ORGANO-ZINC COMPOUNDS AND PROCESSES OF MAKING SAME

Jan G. Noltes, Bunnik, Netherlands, assignor to International Lead Zinc Research Organization, Inc., New York, N.Y., a corporation of New York
No Drawing. Filed Jan. 12, 1966, Ser. No. 520,101
Claims priority, application Netherlands, Jan. 14, 1965, 6500454
Int. Cl. C07f 3/06
U.S. Cl. 260—429.9          3 Claims

ABSTRACT OF THE DISCLOSURE

Organo-zinc compounds having the formula $RZnXY_2$ or $RZnXCZX'Y_2$ wherein R and Y represent certain aliphatic or aromatic groups, X and X' trivalent nitrogen, phosphorous, or arsenic, and Z is oxygen or sulfur; as well as a method for preparing such compounds by reacting the compounds $R_2Zn$ with $HXY_2$; or by reacting compounds $RZnXY_2$ with an aliphatic or aromatic isocyanate or isothiocyanate.

---

The present invention relates to new organo-zinc compounds and to the processes of making the same. It also relates to processes of polymerization of using said compounds as catalysts.

The new organo-zinc compounds have the general formula $$RZnXY_2$$

in which

R is the symbol for a substituted or non-substituted alkyl aryl or cycloalkyl or aralkyl group, or a group containing one or more heteroatoms, in which group the longest chain contains 1 to substantially 12 carbon atoms and is attached directly to the zinc atom via a carbon atom;

X represents a trivalent nitrogen or a trivalent phosphorus or a trivalent arsenic atom, directly attached to the zinc atom;

Y (each) is a substituted or nonsubstituted organic group, such as a substituted or nonsubstituted alkyl or aryl or cycloalkyl group or a group containing one or more heteroatoms.

If, in particular, X is nitrogen, the Y group may comprise as a substituent, a —CO— or —CS— group, one end of which is attached to the nitrogen atom on the one hand and the other end to a nitrogen (as in $$EtZnNPh.CO.NPh_2)$$

or phosphorus (as in $EtZnNPh.CS.PPh_2$) atom on the other hand, the latter nitrogen or phosphorus atom being connected to two more organic groups at the same time. The groups Y may be identical (as in $EtZnNPh_2$) or different (as in $EtZnNPh.CO.NPh_2$).

Examples of the compounds coming under the general formula are:

| | M.P., ° C. |
|---|---|
| $PhZnNPh_2$ (Ph=phenyl) | 192–195 |
| $EtZnNPh_2$ (Et=ethyl) | 104–106 |
| $i-PrZnNPh_2$ (i-Pr=isopropyl) | 106–107 |
| $n-BuZnNPh_2$ (n-Bu=n-butyl) | 83–85 |

$EtZnNEt_2$ is a liquid at room temperature.

as are also compounds of the following type:

| | M.P., ° C. |
|---|---|
| $EtZnNPh.CO.NPh_2$ | 214–217 |
| $EtZnNPh.CO.NPh_2$ | 117–118 |
| $EtZnNPh.CS.NPh_2$ | 225–227 |
| $EtZnNPh.CS.NEt_2$ | 124–125 |
| $PhZnNPh.CS.NPh_2$ | 243–245 |
| $EtZnNMe.CS.NPh_2$ (Me=methyl) | 172–173 |
| $EtZnNPh.CS.PPh_2$ | 139–142 |
| $PhZnNPh.CS.PPh_2$ | 165–175 |
| $EtZnNPh.CO.PPh_2$ | 98–105 |
| $PhZnNPh.CO.PPh_2$ | 135–140 |

These novel organo-zinc compounds are properly so termed because one of the valencies of the zinc atom is directly attached to a carbon atom of the group R. This group R may be a branched or a straight alkyl group or another group as specified. The longest chain present in group R normally will not contain more than 12 carbon atoms. It should be noted that the atom X (i.e., a nitrogen or phosphorus or arsenic atom) is joined to two groups Y but that these groups Y may or may not be identical (i.e., groups Y may be "mixed").

These compounds may be made by several methods, as for example:

$$R_2Zn + HNY_2 \rightarrow RZnNY_2 + RH$$
$$R_2Zn + HPY_2 \rightarrow RZnPY_2 + RH$$
$$R_2Zn + HAsY_2 \rightarrow RZnAsY_2 + RH$$

Some members of the novel zinc compounds of the invention will readily undergo further chemical reactions with formation of other zinc compounds which, however, still fall within the scope of the invention. Some of these reactions are represented schematically in what follows where the symbol Ar. stands for an aromatic group; the symbol Aph. for an aliphatic group whereby Ar.NCO means an aromatic isocyanate and Aph.NCS an aliphatic isothiocyanate. Such aromatic or aliphatic iso(thio)cyanates may be reacted as follows:

$$RZnNY_2 + Ar.NCO \rightarrow RZnN(Ar.)CONY_2$$
$$RZnNY_2 + Aph.NCO \rightarrow RZnN(Aph.)CONY_2$$
$$RZnNY_2 + Ar.NCS \rightarrow RZnN(Ar.)CSNY_2$$
$$RZnNY_2 + Aph.NCS \rightarrow RZnN-Aph.)CSNY_2$$
$$RZnPY_2 + Ar.NCO \rightarrow RZnN(Ar.)COPY_2$$
$$RZnPY_2 + Aph.NCO \rightarrow RZnN(Aph.)COPY_2$$
$$RZnPY_2 + Ar.NCS \rightarrow RZnN(Ar.)CSPY_2$$
$$RZnPY_2 + Aph.NCS \rightarrow RZnN(Aph.)CSPY_2$$
$$RZnAsY_2 + Ar.NCO \rightarrow RZnN(Ar.)COAsY_2$$
$$RZnAsY_2 + Aph.NCO \rightarrow RZnN(Aph.)COAsY_2$$
$$RZnAsY_2 + Ar.NCS \rightarrow RZnN(Ar.)CSAsY_2$$
$$RZnAsY_2 + Aph.NCS \rightarrow RZnN(Aph.)CsAsY_2$$

It will easily be seen that for example the product of the third reaction listed above, namely, $$RZnN(Ar.)CSNY_2$$

falls within the scope of the invention because the zinc atom is attached to group R and to a nitrogen atom and one of the two other valencies of the nitrogen atom is attached to an aromatic group and the remaining valency of the nitrogen atom is attached to a $CONY_2$ group which is an organic group containing two differing atoms (herein termed heteroatoms) namely an O and an N atom.

Usually such reactions are exothermic.

The compounds according to this inventinon are useful as polymerization catalysts as for example to promote the polymerization of monomers such as $CCl_3CHO$, HCHO or $CH_3CHO$, i.e., for the polymerization of carbonyl compounds, see Examples XIX to XXIV. They have a marked tendency to promote the trimerization of compounds such as isocyanates. The polymerization of carbonyl compounds has been the subject of a book by Junji Furukawa and Takeo Saegusa, "Polymerization of Aldehydes and Oxides," Interscience Publishers Inc., New York, 1963 (especially Chapter II). The trimerization of isocyanates is discussed by Edwin H. Smolin and Lorence Rapoport "s-Triazines and Derivatives," Interscience Publishers Inc., New York, 1959 (Chapter VII). Another pertinent publication is of Wayne R. Sorensen and Todd W. Campbell "Preparative Methods of Polymer Chemistry," Interscience Publishers Inc., New York 1961.

When carrying out the preparative reactions, moisture should be excluded as much as possible not only on account of the zinc-carbon bond, but also for instance the zinc-nitrogen bond which tend to undergo hydrolyses in the presence of moisture. In addition to this, many of the starting substances or final products are sensitive to oxygen, as for instance the bond of zinc and trivalent phosphorus under consideration. The process is, therefore, preferably carried out in an inert reaction medium.

The preparatory reactions may or may not be carried out in a solvent.

The substances containing a zinc-nitrogen bond present few problems. But those containing a zinc-phosphorus bond have a slight tendency towards a certain polymerization. This is of no importance for their application, but it does mean that the melting points of such so-called polymers are not sharp. This so-called polymerization also means that not all solvents are equally appropriate, although quite normal solvents are easily found, in which such products can be dissolved or (in case solvents are desirable for their preparation) kept.

As stated before with regard to reactions with iso(thio)cyanates, the group Y and incidentally also the group R may contain heteroatoms. Ring structures may also be synthesized. If a compound of the general type

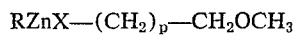

$$RZnX\text{---}(CH_2)_p\text{---}CH_2OCH_3$$

is synthesized, actually the end-standing oxygen atom (of the methoxy group) will form a more or less distinct bond with the zinc atom. It is very well possible to obtain other ring structures, for instance if piperidine is used as a secondary amine in the synthesis of these new compounds. The nitrogen atom is then attached to the zinc on the one hand and the two other valencies are attached to each other via a carbon ring.

In preparing the compounds of the invention as illustrated in the examples, it will be helpful to keep the following in mind.

The reaction of $Et_2Zn+Ph_2NH$ in benzene does not run smoothly. Without a solvent it takes about 1½ hours at 100° C.; even better when heated above the melting point. At 150° C. the reaction is completed within ½ hour. The product may be recrystallized from benzene-pentane. On the whole, the same holds good in the case of Y=isopropyl or n-butyl.

Compounds of the type

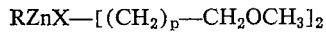

$$RZnX\text{---}[(CH_2)_p\text{---}CH_2OCH_3]_2$$

can generally be dissolved as dimers in benzene.

If $Et_2Zn$ is refluxed in $Et_2NH$, only one ethyl group will react and $EtZnNEt_2$ is obtained.

A substance such as $PhZnNPh_2$ is easily obtained in benzene within 40 minutes at reflux.

$PhZnNEt_2$ is obtained in two hours at 100° C. without a solvent.

$EtZnPPh_2$ is obtained within ½ hour in hexane or benzene at reflux. The product does not readily dissolve in hexane and is, therefore, precipitated—not so from benzene, in which it readily dissolves. The melting point is vague.

$PhZnPPh_2$ is produced under reflux in benzene, in which it dissolves. The melting point is about 165–170° C.

Example I.—Ethylzinc diphenylamide

A mixture of 11.26 g. of diphenylamine and 7.10 cm.³ (8.24 g.) of diethylzinc was heated for one hour at 150° C. under nitrogen, after which gas development had finished. After the light yellow reaction product had been cooled and washed out with pentane, 16.89 g. (96% of the theoretical amount) of a colourless, crystalline compound having a melting point of 105–106° C. (Zn, found 24.57%; calculated 24.87%. N, found 5.46%; calculated 5.33%) were obtained.

Example II.—Phenylzinc diethylamide

Upon mixing 2.76 g. of diphenylzinc and 0.92 g. of diethylamine under nitrogen heat was evolved. The mixture was kept at 90° for two hours and finally for thirty minutes at 90° in vacuo to remove volatile material. In this way 2.42 g. (90% of the theoretical amount) of a slightly yellow oil (Zn, found 30.84%; calculated 30.47%) were obtained.

Example III.—N-phenylzinc-phenylformamide

Upon mixing 3.95 g. of diphenylzinc and 2.18 g. of N-phenylformamide in 20 ml. of benzene under nitrogen an exothermal reaction occurred. After keeping the mixture at reflux temperature for thirty minutes 10 ml. of benzene was distilled off and replaced by 20 ml. of pentane. Upon cooling, a white crystalline solid separated which was washed with pentane. The yield of this product with M.P. 145–155° (Zn, found 24.69%; calculated 24.90) was 4.60 g. (97% of the theoretical amount).

Example IV.—N-ethylzinc-acetanilide

To a solution of 14.0 g. diethylzinc in 60 ml. of toluene kept at −50° under nitrogen 13.0 g. of acetanilide was added in one portion. Upon gradually warming the reaction mixture to room temperature 2160 ml. of ethane were evolved. The solvent was evaporated in vacuo and the crystalline residue washed with cold pentane. In this way 19.4 g. (88% of the theoretical amount) of a white solid with M.P. 140° (Zn, found 27.96%; calculated 28.13%) was obtained.

Example V.—N-phenylzinc-N,N′,N′-trimethylethylenediamine

A solution of 1.25 g. of diphenylzinc and 0.58 g. N,N′,N′-trimethylethylenediamine in 10 ml. of benzene is heated for one hour at reflux. After replacement of most of the benzene by 20 ml. of pentane and cooling, a crystalline solid with M.P. 145–149° separates. As appears from the analysis the compound crystallizes as a 1:1 complex with diphenylzinc (Zn, found 28.35%; calculated 28.24%. N, found 6.57%; calculated 6.07%). The yield was 0.85 g. (64% of the theoretical amount).

Example VI.—N-phenylzinc-N-phenyl-N′,N′-diethylurea

A solution of 1.95 g. of phenylzinc diethylamide and 1.08 g. of phenylisocyanate in 15 cm.³ of pentane was heated under reflux for three hours. By cooling the reaction mixture in acetone and solid carbon dioxide and washing-out of the separated product with cold pentane, 2.77 g. (91% of the theoretical amount) of a colourless compound having a melting point of 160–165° (Zn, found 19.38%; calculated 19.59%) was isolated.

Example VII.—Methyl N-ethylzinc-N-phenylcarbamate

To a solution of 2.47 g. of diethylzinc in 20 ml. of benzene kept at 0° under nitrogen a solution of 3.0 methyl N-phenylcarbamate in 20 ml. of benzene was added dropwise with stirring. After the spontaneous development of gas had stopped, 50 ml. of pentane was added after partial removal of the benzene. A white solid crystallized upon cooling. After washing with pentane and drying, the product melted at 148–150° (Zn, found 26.98%; calculated 26.76%). The yield was 3.1 g. (63% of the theoretical amount).

Example VIII.—N-ethylzinc-N-methyl-N′,N′-diphenylthiourea

To a solution of 2.05 g. of ethylzinc diphenylamide in 50 ml. of pentane, kept at 40° under nitrogen 0.57 g. of methylisothiocyanate dissolved in 15 ml. of pentane was added dropwise with stirring. A white crystalline solid separated from the solution. After washing with pentane and drying, the yield was 2.33 g. (89% of the theoretical amount) with a M.P. 172–173° (Zn, found 19.36%; calculated 19.47%).

Example IX.—Phenylzinc diphenylphosphide

A solution of 3.0 g. of diphenylzinc and 2.5 g. diphenylphosphine in 35 cm.³ of benzene was heated under reflux for 90 minutes. After the partial removal of benzene and the addition of 20 cm.³ of pentane, there crystallized 4.25 g. (95% of the theoretical amount) of a colourless compound having a melting point of 165–170° C. (Zn, found 19.99%; calculated 19.95%. P, found 9.80%; calculated 9.45%).

Example X.—Ethylzinc dibutylphosphine

Upon heating a mixture of 3.60 g. of diethylzinc and 4.12 g. of dibutylphosphine at 90° for 50 minutes, the theoretical amount of ethane was evolved. After heating in vacuo at 90° for thirty minutes, a viscous oil resulted which gradually solidified. The yield of colourless, crystalline product was 6.40 g. (92% of the theoretical amount) with a M.P. 43–45° (P, found 12.99%; calculated 12.92%).

Example XI.—Ethylzinc diphenylphosphide

A solution of 2.4 g. of diethylzinc and 3.2 g. of diphenylphosphine in 20 ml. of toluene was heated at 100° under nitrogen for three hours resulting in the evolution of the theoretical amount of ethane (435 ml.). Upon standing, a white solid separated from the solution. After washing with pentane and drying the yield was 3.9 g. (81% of the theoretical amount). The product (P, found 11.27%; calculated 11.08%) did not melt below 300°.

Example XII.—Diphenyl-(N-phenylzinc-N-phenylcarbamoyl)phosphine

A solution of 1.56 g. of phenylzinc diphenylphosphine and 0.57 g. of phenylisocyanate in 30 cm.³ of benzene was heated under reflux for six hours. After partial removal of the solvent and addition of 50 cm.³ of pentane, a crystalline compound segregated. After washing out with pentane, 1.87 g. (88% of the theoretical yield) of a colourless crystalline compound, which melted at 135–140° under decomposition, was isolated (Zn, found 14.66%; calculated 14.64%. P, found 6.78%; calculated 6.93%).

Example XIII.—Diphenyl-(N-butylzinc-N-methylcarbamoyl)phosphine

A solution of 5.17 g. of butylzinc diphenylphosphine and 0.96 g. of methylisocyanate in 30 ml. of benzene was heated under reflux for two hours (nitrogen atmosphere). 25 ml. of benzene was distilled off and replaced by 40 ml. of pentane. Upon cooling, 2.46 g. (40% of the theoretical amount) of a colourless solid with M.P. 125–130° (P, found 8.49%; calculated 8.92%) separated from the solution.

Example XIV.—Diphenyl-(N-ethylzinc-N-phenylthiocarbamoyl)phosphine

A mixture of 7.69 g. of ethylzinc diphenylphosphide and 3.71 g. of phenylisothiocyanate in 40 cm.³ of benzene was heated under reflux for an hour and a half. After cooling, a brown solution was decanted from a brown-yellow mass of crystals. After washing the reaction product with pentane, 8.09 g. (71% of the theoretical amount) of a light yellow compound having a melting point of 139–142° was isolated. (P, found 7.63%; calculated 7.46%. S, found 7.82%; calculated 7.73%).

Example XV.—Ethylzinc diphenylarsenide

A solution of 1.45 g. of diethylzinc and 2.37 g. diphenylarsine in 10 ml. of benzene was heated under reflux for four hours (nitrogen atmosphere). After replacing most of the benzene by 20 ml. of pentane and cooling, 2.65 g. (82% of theoretical amount) of a colourless, crystalline solid with M.P. 223–226° (Zn, found 20.48%; calculated 20.20%) was isolated.

Example XVI.—Trimethylisocyanurate from methyl isocyanate and N-ethylzinc-N,N′,N′-triphenylurea To a solution of 0.98 g. of N-ethylzinc-N,N′,N′-triphenylurea in 20 ml. of benzene kept under nitrogen, a solution of 37.7 g. of methyl isocyanate in 10 ml. of benzene was added at a rate to maintain steady reflux. A white crystalline solid started to separate after a few minutes. When the mixture had reached room temperature the solid was isolated by filtration and washed with pentane. In this way 37.7 g. (theoretical yield) of trimethylisocyanurate with M.P. 178–179° was obtained.

Example XVII.—Triphenylisocyanurate from phenylisocynate and ethylzinc diphenylphosphide To a freshly prepared solution of 0.28 g. ethylzinc diphenylphosphide in 25 ml. of toluene kept under nitrogen 30 g. of phenylisocyanate was added in one portion. After the evolution of heat had ceased the mixture was kept at reflux temperature for two hours. After cooling, the solid product which had separated was isolated by filtration and washed with pentane. In this way 26.4 g. of triphenylisocyanurate (80% of the theoretical amount) with M.P. 299° was obtained.

Example XVIII.—Trimethylisocyanurate from methylisocyanate and ethylzinc diphenylarsenide A solution of 1.62 g. methylisocyanate and 0.18 g. of ethylzinc diphenylarsenide in 10 ml. of benzene was kept at 50° for one hour under nitrogen. The solid product which had separated was isolated by filtration. In this way 1.48 g. (91% of the theoretical amount) of trimethylisocyanurate with M.P. 179° was obtained.

Example XIX.—Polymerization of formaldehyde using ethylzinc diphenylphosphire catalyst 10.0 g. of dry, gaseous formaldehyde was passed into a solution of 28 mg. (0.03 mole percent) of ethylzinc diphenylphosphide in 200 ml. of toluene kept at −40° under nitrogen. 2 ml. of methanol was added and the mixture was allowed to reach room temperature. Upon filtration 7.6 g. (76% of the theoretical amount) of polyformaldehyde with an inherent viscosity of 1.18 (measured in p-chlorophenol containing 2% of α-pinene at 65°) was obtained.

Example XX.—Polymerization of formaldehyde using ethylzinc diphenylphosphide catalyst 10.0 g. of dry, gaseous formaldehyde was passed into a solution of 28 mg. (0.03 mole percent) of ethylzinc diphenylphosphide in 200 ml. of decaline kept at 20° under nitrogen. After addition of 2 ml. of methanol 8.3 g. (83% of the theoretical amount) of polyformaldehyde with an inherent viscosity of 1.78 was isolated.

Example XXI.—Polymerization of formaldehyde using butylzinc diphenylamide catalyst Following the procedure described in Example XX using 0.008 mole percent of butylzinc diphenylamide 9.5 g. (95% of the theoretical amount) of polyformaldehyde with an inherent viscosity of 1.60 was obtained.

Example XXII.—Polymerization of acetaldehyde using N-ethylzinc acetanilide catalyst To a solution of 0.71 g. of N-ethylzinc acetanilide in 100 ml. of toluene kept at −78° under nitrogen, 13.7 g. of freshly distilled acetaldehyde cooled to −78° was added with stirring. After 45 minutes the mixture had gelled completely. The resulting mixture was kept at −78° for 42 hours. After addition of 5 ml. of methanol and warming to room temperature 100 ml. of hexane was added. The solid polymer was then isolated by filtration. After washing with hexane and removal of volatiles in vacuo 7.9 g. (58% of the theoretical amount) of solid polyacetaldehyde was obtained, which as appeared from the I.R. spectrum was highly stereoregular.

Example XXIII.—Polymerization of acetaldehyde using phenylzinc diphenylphosphide catalyst To a catalyst solution prepared under nitrogen by dissolving 0.80 g. of phenylzinc diphenylphosphide in 98 ml. of toluene and cooling to −78°. 13.3 g. of acetaldehyde cooled to −78° was added in one portion. This mixture was kept under nitrogen at −78° for 40 hours. After addition of 5 ml. of methanol and warming to room temperature, 100 ml. of hexane was added. The solid polymer was isolated by filtration, washed repeatedly with hexane and separated from volatiles by keeping in vacuo. In this way 10.3 g. (77% of the theoretical amount) of solid polyacetaldehyde was obtained.

Example XXIV.—Polymerization of acetaldehyde using ethylzinc diphenylamide catalyst To a solution of 0.89 g. ethylzinc diphenylamide in 110 ml. of pentane kept under nitrogen at −78°, 15.0 g. of acetaldehyde cooled to −78° was added in one portion. After keeping at −78° for 45 hours 5 ml. of methanol was added. After warming to room temperature 7.7 g. (51% of the theoretical amount) of solid poly-acetaldehyde was isolated by filtration and removal of solvent in vacuo.

I claim:
1. Organo zinc compounds having the formula

$$RZnXY_2$$

wherein
R is the radical alkyl, or aryl, or aralkyl or cycloalkyl, any alkyl group in the radical R having a maximum chain length of 12 carbon atoms and said group R being attached directly to the zinc atom through a carbon atom;
X is nitrogen;
Y is a radical alkyl, or aryl, or aralkyl or cycloalkyl; provided that one Y radical is $CZX'Y_2$ wherein
Z is oxygen or sulfur;
X' is trivalent nitrogen, phosphorus, or arsenic.

2. Organo zinc compounds having the formula $$RZnXY_2$$

wherein
R is the radical alkyl, or aryl, or aralkyl or cycloalkyl, any alkyl group in the radical R having a maximum chain length of 12 carbon atoms and said group R being attached directly to the zinc atom through a carbon atom;
X is nitrogen;
Y is a radical alkyl, or aryl, or aralkyl or cycloalkyl; provided that one Y radical is acyl or aminoalkyl.

3. The process for preparing compounds according to claim 1 which comprises reacting the compound $RZnXY_2$ with an aliphatic or aromatic isocyanate or isothiocyanate.

References Cited

UNITED STATES PATENTS

| | | | |
|---|---|---|---|
| 1,938,585 | 12/1933 | Estabrooke | 260—431 XR |
| 2,046,876 | 7/1936 | Jones. | |
| 2,104,316 | 1/1938 | Booer | 260—431 XR |
| 2,356,476 | 8/1944 | Shappiro | 260—429.9 XR |
| 2,480,814 | 8/1949 | Gunshon et al. | 260—429.9 XR |
| 2,849,420 | 8/1958 | Stevens et al. | 260—429.9 XR |
| 3,210,278 | 10/1965 | Ryer et al. | 260—429.9 XR |
| 3,305,330 | 2/1967 | McCoy et al. | 260—429.9 XR |
| 3,313,741 | 4/1967 | Uelzmann et al. | 260—429.9 XR |
| 3,318,932 | 5/1967 | Kornicker | 260—429.9 XR |
| 3,062,755 | 11/1962 | Hill et al. | 260—429.9 XR |

OTHER REFERENCES

Chemical Abstracts: vol. 57, pp. 13399i–13400a (1962).

Chemical Abstracts; vol. 61, p. 580c (1964).

TOBIAS E. LEVOW, Primary Examiner

H. M. S. SNEED, Assistant Examiner

U.S. Cl. X.R.

252—431; 260—67, 615

PO-1050
(5/69)

UNITED STATES PATENT OFFICE
CERTIFICATE OF CORRECTION

Patent No. 3,461,147      Dated Aug. 12, 1969

Inventor(s) Jan G. Noltes

It is certified that error appears in the above-identified patent and that said Letters Patent are hereby corrected as shown below:

Col. 2, line 38, change the formula to read

-- $RZnNY_2 + Aph.NCS \rightarrow RZnN(Aph.)CSNY_2$ --

Col. 3, line 31, change the formula to read

-- $RZnX-[(CH_2)_p-CH_2OCH_3]_2$ --

Col. 3, line 52, change the formula to read

-- $RZnNY_2$ --

Col. 6, line 35, change "diphenylphosphire" to -- diphenylphosphide --

Col. 8, line 34, change "p. 580c" to -- p. 5680c --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents